J. H. DAVIES.
CLAW FOR MILKING MACHINES.
APPLICATION FILED MAR. 18, 1918.
1,278,868.
Patented Sept. 17, 1918.
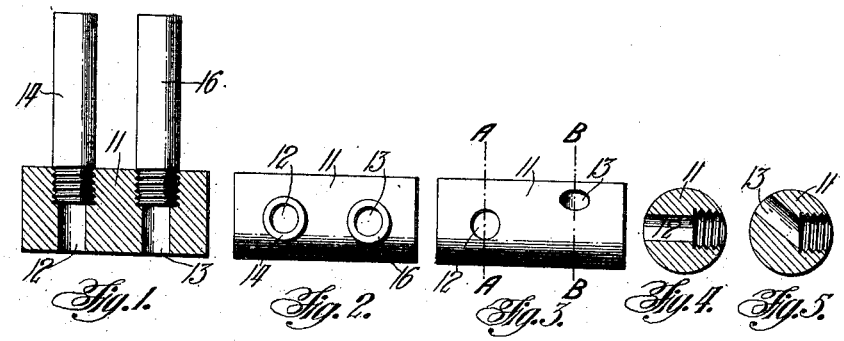
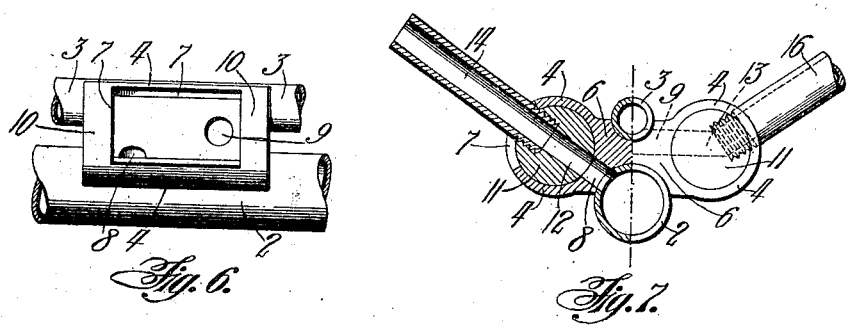
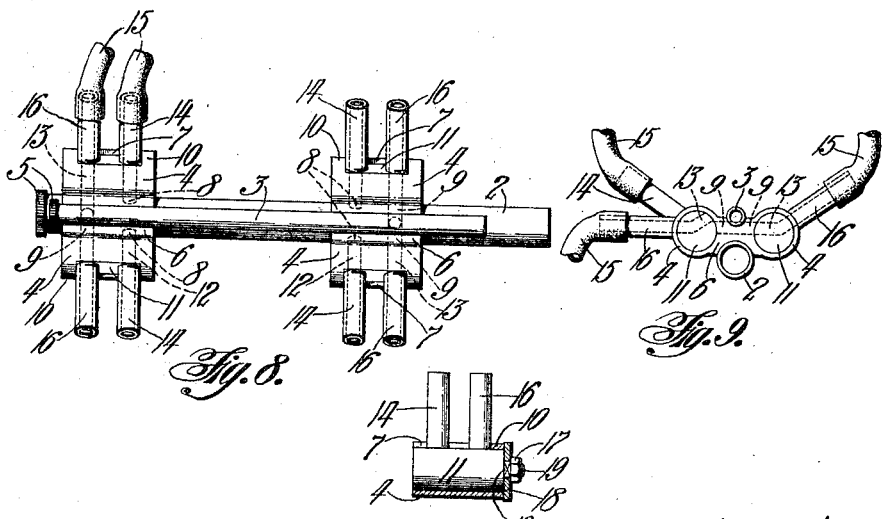
Inventor:
John Henry Davies

UNITED STATES PATENT OFFICE.

JOHN H. DAVIES, OF MELBOURNE, VICTORIA, AUSTRALIA.

CLAW FOR MILKING-MACHINES.

1,278,868. Specification of Letters Patent. Patented Sept. 17, 1918.

Application filed March 18, 1918. Serial No. 223,168.

*To all whom it may concern:*

Be it known that I, JOHN HENRY DAVIES, a subject of the King of Great Britain and Ireland, and a resident of the city of Melbourne, in the county of Bourke, State of Victoria, Commonwealth of Australia, (whose post-office address is 592 Bourke street, in the said city of Melbourne,) have invented certain new and useful Improvements in Claws for Milking-Machines, of which the following is a specification.

This invention relates to claws for milking machines which by means of flexible tubes are connected to the teat cups of the machine. In machines of the class mentioned, when a teat cup falls from a cow during milking operations it is necessary to immediately turn the cup over onto the claw thereby bending or pinching the flexible tubes in order to prevent the falling of all the teat cups leading to damage to same. The same operation is necessary with each of the teat cups before they are applied to the animal in order to prevent temporary reduction of the vacuum. The continual bending of the flexible tubes for the purposes mentioned shortens the life of the tubes leading to trouble and expense. A further objection to the common type of claw is the partial breaking down of vacuum due to the accidental fall of one or more teat cups from their resting position upon the claw while being moved during milking operations.

The object of the present invention is to provide a claw of simple and convenient design wherein the source of vacuum is automatically cut off until the teat cups are elevated for connection to the teat of the cow and with which it is not necessary to bend or pinch the flexible tubing connecting each cup to the claw.

A claw made according to the invention may be suspended to the machine or other convenient position after having been removed from a cow without the necessity of operating any taps in order to prevent the breaking down of the vacuum. An advantage of the construction is that the milk tubes and branches may be readily cleansed, an approximately straight through passage between the milk tube and the milk branch being available for the purpose.

The invention also comprehends the advantage of being able to disconnect one or more teat cups from the cow without interfering with the effectiveness of the remaining cups.

Referring to the drawings which form a part of this specification—

Figure 1 shows a sectional view of a plug with its two branches attached.

Fig. 2 is a plan of Fig. 1.

Fig. 3 is a reverse plan of Fig. 1.

Fig. 4 is a section of line A—A, Fig. 3.

Fig. 5 is a section of line B—B, Fig. 3.

Fig. 6 is a view looking outside a plug chamber the plug being removed.

Fig. 7 is an end view of Fig. 6 partly in section and showing the plugs and branches in place.

Fig. 8 is a plan view of a complete claw on a reduced scale.

Fig. 9 is an end view of Fig. 8 one pair of branch pipes being shown down and cut off from the milk and pulsation pipes.

Fig. 10 shows a modified method of mounting a plug in its chamber.

According to the invention the usual milk pipe 2 and pulsation pipe 3 are preferably arranged in parallel. The relative position between the pipes otherwise is immaterial, it being only necessary that the said pipes should be in an approximately horizontal position beneath the cow during the milking operations.

In carrying out the invention it has been found effective to mount the milk pipe 2 in parallel beneath the pulsation pipe 3 although it is not limited in its usefulness to such a position. In the following description it will be referred to as being arranged in such a manner. The pipes 2 and 3 are closed at one end by suitable inspection plugs or stoppers 5 the other end of said pipes being adapted for connection to the flexible service pipes of the machine.

Disposed one at each side of each end of the milk and pulsation pipes are four circular plug chambers 4 arranged in pairs. Each pair of chambers is positioned approximately near one end of the milk and pulsation pipes as seen in Fig. 3 and is united by a bridge 6. Each circular chamber has longitudinal elongated slots or openings 7 removed from that part of its circumference farthest from the milk and pulsation pipes. These openings leave bridges 10 at each end of the chambers. Each chamber 4 has therein adjacent the milk and pulsation pipes two passages,—a milk passage 8—communicating with the milk pipe, and—a pulsation passage 9—communicating with the pulsation pipe. The chamber may be made in any suitable manner and may be open at one end or both ends to receive a circular plug and branch pipes hereinafter described which branch pipes when attached to the plugs retain them within the chambers. Or the ends of the chambers may be closed by covers.

Accommodated by each of the circular chambers is a circular plug 11. Each plug has two ports therethrough, one port 12 communicating with the milk passageway 8 in the chamber 4 and the other port 15 with the pulsation passage 9 in said chamber. The circular plugs are capable of a partial rotary movement within the circular chambers.

Threaded to each circular plug are the inner ends of two branches. One branch 14 connects with the port communicating with the passage to the milk pipe. The other branch 16 connects with the port communicating with the passage to the pulsation pipe. These branches protrude through the openings 7 in the plug chambers and prevent longitudinal movement of the plug therein. The branches are connected to the teat cups by the flexible tube 15.

With a milking machine having claws made according to the present invention, the claws may be supported in any convenient position without detrimental effect or the breaking down of the vacuum, for the reason that the weight of the teat cups carried by the branch pipes draws the branches downwardly. This partially rotates the circular plugs in the circular chambers and thereby cuts off communication between the ports in the plugs and the corresponding passages leading from the chambers 4 to the milk and pulsation pipes. When the attendant is ready to commence milking operations and connect the teat cups he lifts the teat cups into the required position and applies them to the animal. The lifting of each teat cup during this operation partially rotates the particular plug in the particular chamber concerned bringing the same to its uppermost limit of travel as seen in Fig. 7, whereupon communication between the ports 12, 13 in the plug and the passages 8, 9 in the circular chamber is established and the vacuum existing in the milk tube will hold the teat in position. The same operation applies to each teat cup. In the event of it being desired to disconnect one or more of the teat cups the cup is allowed to hang downwardly and its weight causes the respective plug to partially rotate and cut off communication with the milk and pulsation pipes. Thus the remaining cups are not detrimentally affected and may continue to operate. It will be obvious in this regard that the accidental disconnection and falling of a teat cup will not cause the whole of the teat cups to be freed from the cow. The liability of damage to the claw and cups is reduced to a minimum.

All the parts have been designed to permit of simple attachment and detachment to facilitate cleansing. It will be noted that the pulsation passages 9 of each opposite pair of chambers 4 are formed by a single straight passage which extends through the bridge 6 and at its middle opens into the bottom of the pulsation tube 3. These passages together with the milk passages 8 are easily accessible.

The invention has been described as applied to a well known form of milking system, but it is obvious that it may also be applied to other classes of machine including such as may require that only the milk branch be connected to the circular plugs in which case the branch communicating with the pulsation pipe will not require to close communication, but may be of the common rigid type. The circular plug chamber may, as previously mentioned, be constructed in a variety of forms. The right is reserved to utilize the pressure of springs for maintaining the circular plugs in the chambers in their proper relative positions or to have the chambers and their slots open at one or both ends and closed by a cap to permit access of the circular plugs which may in such a case have the branches permanently attached thereto. In Fig. 10 the slot 7 in the plug chamber is open at one end which permits of the plug being inserted or withdrawn from the chamber without removing the branches. The plug is held in place by a nut 17 and washer 18, engaging an extension 19 of the plug. Claws made according to the invention may also have one, two, three or more branch tubes attached to each circular plug with a corresponding number of main tubes. Further, in some instances, it may be advisable to use only one plug in each claw or more than one as may be convenient. Claws produced in accordance with the invention are of simplified design with short and direct passages, which, as indicated greatly facilitate the operation of cleansing.

Having now described my invention which I claim as new and desire to secure by Letters Patent is:—

1. In claws for milking machines, a pipe adapted to have a vacuum created therein, a plug chamber arranged upon one side of and extending longitudinally of the pipe and having a transverse port in communication with the bore of the pipe, a plug mounted to turn in the chamber and having a transverse port to register with the first named port when the plug is in the upper position, and a teat cup coupling rigidly secured to the plug and adapted to automatically swing it downwardly when the teat cup slips from the teat.

2. In claws for milking machines, a pipe adapted to have a vacuum created therein, a bridge extending longitudinally of the pipe and having plug chambers arranged upon opposite sides of the pipe, the plug chambers having transverse ports in communication with the bore of the pipe, plugs mounted to turn in the chambers and having transverse ports to register with the first named transverse ports when the plugs are in the upper position, and teat cup couplings secured to the plugs and adapted to automatically swing them downwardly when the teat cups slip from the teats.

3. Improvements in claws for milking machines, comprising a milk pipe and an adjacent pulsation pipe, a circular plug chamber arranged at each side of said pipes, a bridge extending between said chambers and having a milk passage leading from each plug chamber to the milk pipe and a pulsation passage extending between the two plug chambers and opening at the middle into the pulsation pipe, each of said plug chambers having an elongated slot or opening in its outer side, a milk branch and a pulsation branch attached to each plug and passing through said slot and said plugs being provided with ports extending from said branches through the plugs and adapted to register respectively with said milk passage and said pulsation passage substantially as set forth.

4. In claws for milking machines, a milk pipe, a pulsation pipe extending longitudinally of the milk pipe in substantially parallel relation thereto, a bridge arranged between said pipes and provided with spaced plug chambers disposed upon opposite sides of the said pipes, each plug chamber having ports which lead into the bores of the pipes, plugs mounted to turn in the chambers, each plug having transverse ports adapted to register with the ports of its chamber and couplings connected with each plug and leading into the ports thereof.

In testimony whereof I affix my signature.

J. H. DAVIES.